United States Patent
Burt et al.

(10) Patent No.: US 7,241,965 B2
(45) Date of Patent: Jul. 10, 2007

(54) METHOD AND APPARATUS FOR LASER WELDING WITH PLASMA SUPPRESSION

(75) Inventors: Paul Burt, Bristol (GB); Anthony J. Griffith, Bristol (GB); Andrew P. Green, Bristol (GB)

(73) Assignee: Rolls-Royce plc, London (GB)

( * ) Notice: Subject to any disclaimer, the term of this patent is extended or adjusted under 35 U.S.C. 154(b) by 0 days.

(21) Appl. No.: 10/519,359

(22) PCT Filed: Jun. 9, 2003

(86) PCT No.: PCT/GB03/02460

§ 371 (c)(1),
(2), (4) Date: Dec. 28, 2004

(87) PCT Pub. No.: WO2004/004965

PCT Pub. Date: Jan. 15, 2004

(65) Prior Publication Data

US 2005/0224470 A1    Oct. 13, 2005

(30) Foreign Application Priority Data

Jul. 3, 2002    (GB) ................................ 0215269.2

(51) Int. Cl.
*B23K 26/24*    (2006.01)
*B23K 26/14*    (2006.01)

(52) U.S. Cl. .......................... 219/121.63; 219/121.64; 219/121.84

(58) Field of Classification Search ........... 219/121.63, 219/121.64, 121.84
See application file for complete search history.

(56) References Cited

U.S. PATENT DOCUMENTS 4,303,824 A    12/1981    Morgan et al.

FOREIGN PATENT DOCUMENTS

| DE | 3931401 A1 * | 3/1991 |
|---|---|---|
| DE | 199 45 285 A1 | 3/2001 |
| EP | 0 474 557 A1 | 3/1992 |
| EP | 0 507 268 A2 | 10/1992 |
| EP | 1 013 372 A1 | 6/2000 |
| EP | 1 103 336 A1 | 5/2001 |
| GB | 1 591 793 | 6/1981 |
| JP | A 59-223191 | 12/1984 |
| JP | A 60-049887 | 3/1985 |
| JP | 8-238587 A * | 9/1996 |
| JP | A 8-238587 | 9/1996 |
| JP | A 2000-263276 | 9/2000 |

* cited by examiner

*Primary Examiner*—Geoffrey S. Evans
(74) *Attorney, Agent, or Firm*—Oliff & Berridge, PLC

(57) ABSTRACT

Laser welding apparatus, in which a laser beam is impinged upon a component to be welded at a laser beam impingement point, wherein a plasma suppressor is arranged to impinge a jet of gas on the component at an angle to its surface, flowing towards the laser beam impingement point.

17 Claims, 2 Drawing Sheets

METHOD AND APPARATUS FOR LASER WELDING WITH PLASMA SUPPRESSION

Figure 1:
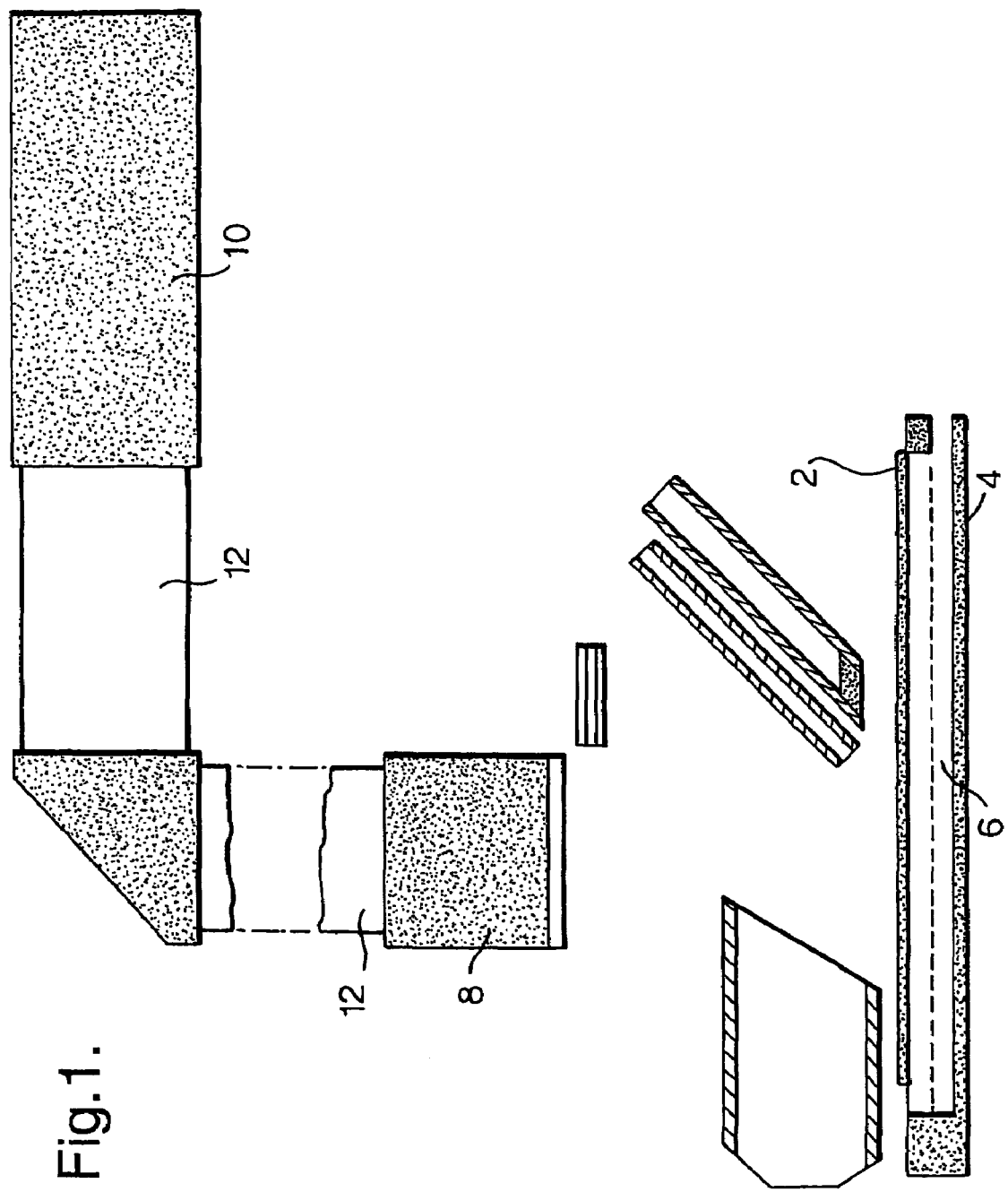

The present invention relates to laser welding. In particular, the present invention provides an improved apparatus and method for plasma suppression during laser welding.

According to a first aspect of the present invention there is provided a laser welding apparatus comprising, a laser, a laser head to focus a laser beam on a component to be welded, and plasma suppression means comprising gas supply means, wherein the plasma suppression means is arranged such that, in use gas is supplied to impinge the component at an angle between about 38° and about 52° to its surface, at a distance of at least 1 mm from the intersection between the laser beam axis and component such that the gas is deflected across the laser beam.

Preferably the laser welding apparatus comprises a laser head to focus the laser beam on the laser beam impingement point, and there is provided a nozzle adjacent the laser head that, in use, provides a jet of high velocity gas over the laser head.

Preferably, the apparatus further comprises a gas extraction means located adjacent the laser beam, diametrically opposite the plasma suppression means.

According to a further aspect of the present invention there is provided laser welding apparatus in which a laser beam is impinged upon a component to be welded at a laser beam impingement point wherein plasma suppression means is arranged to impinge a jet of gas on the component at an angle between about 38° and about 52° to its surface, flowing towards the laser beam impingement point, at a distance of at least 1 mm from the laser beam axis.

Preferably, the plasma suppression gas is supplied to impinge the component at a point, which lies behind the laser impingement point in the welding direction.

Laser welding of materials utilises a laser beam to weld the interface between two parts of a component. As the laser moves along the interface, it locally melts the components, creating a molten pool with a cavity at its centre called a keyhole. The parts melt together at the keyhole and then solidify as the laser moves on.

The depth of the fusion weld so created is, to a large part, dependant upon the power of the laser beam reaching the component. Plasma generated by the interaction of the laser with the component and gas surrounding the weld zone absorbs energy from the laser beam, reducing the penetration of the component, and thus the depth of weld, that can be achieved. Thus it is desirable to suppress plasma produced during the welding process.

Plasma suppression means are known in the art. Typically, they utilise inert gas, blown across the surface of the component, to remove plasma. An improved method of plasma suppression is described in UK Patent 1 591 793 wherein a plasma suppression gas, helium, is used to blow the plasma through the weld zone. However, although the approach enables greater weld penetration when compared with conventional methods, the approach produces a weld of reduced quality, with increased porosity.

The present invention addresses the limitations listed hereto by the provision of an improved apparatus and method for plasma suppression during laser welding.

Figure 2:
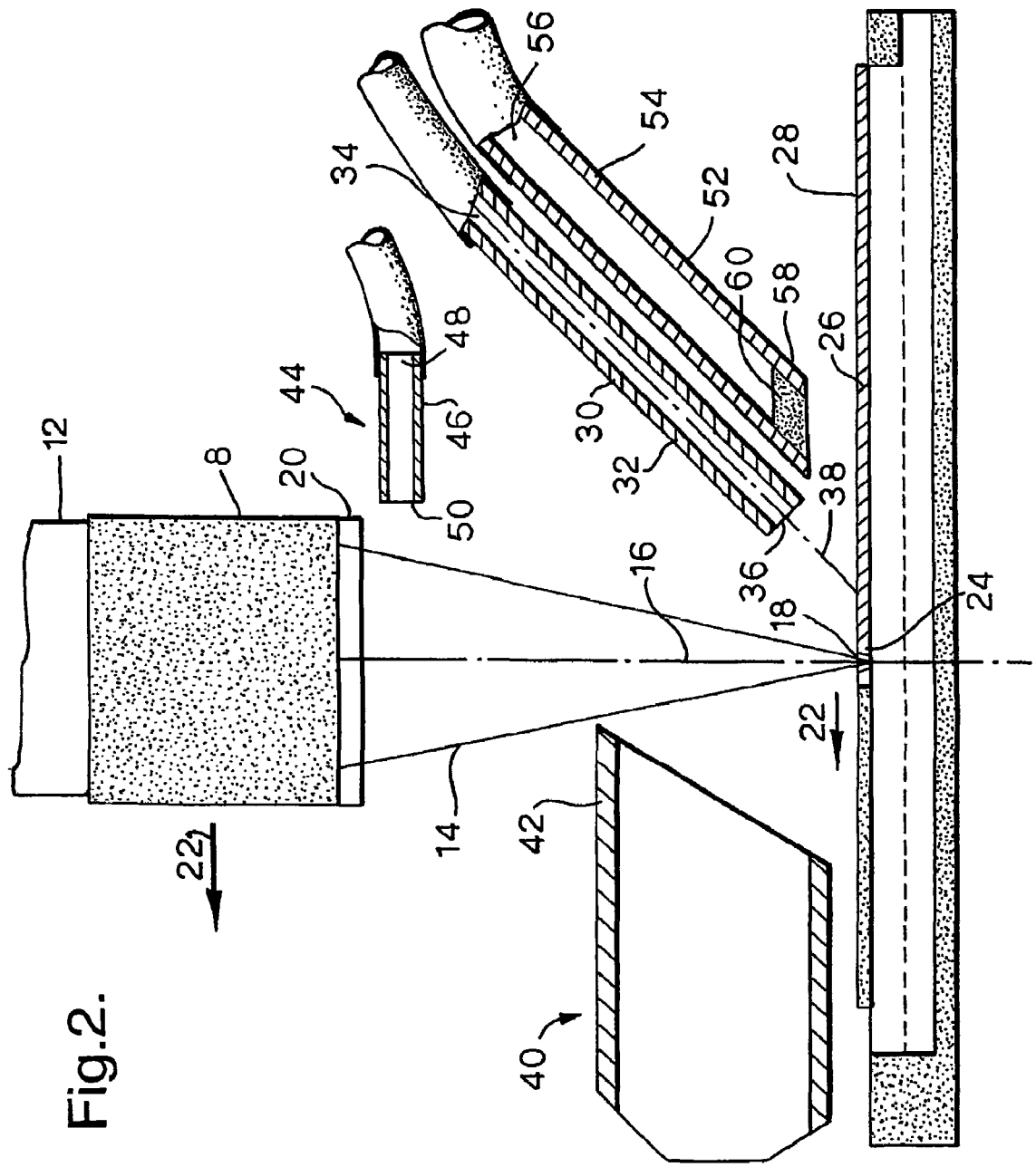

The invention will now be described in more detail with reference to the accompanying drawings in which, FIG. 1 shows apparatus according to the present invention and, FIG. 2 shows a schematic cross section through the apparatus of FIG. 1 being used to carry out the method of the present invention.

Turning now to FIG. 1, there is shown a component 2 mounted to a worktable 4. The worktable 4 has a cavity 6, beneath the component 2, in flow communication with an argon gas supply. Located above the table 4 is a laser head 8, which is mounted to a multi-axis computer numerically controlled (CNC) arm (not shown). The laser head 8 is in optical communication with a laser 10 via an optical conduit 12. For trials, a Haas HL3006 continuous 3 kW Nd:YAG laser was used with a Trumpf TLC1005 work-handling device.

Turning now to FIG. 2, the laser head 8 and worktable 4 of the apparatus shown in FIG. 1 are shown during welding. The laser head 8 concentrates collimated laser light, generated by the laser 10, into a laser beam 14 with an axis 16 at a focus 18. A cover slide 20, transparent to the laser beam 14, protects the internal optics (not shown) of the laser head 8.

During welding, the laser head 8 is moved relative to the component 2 in a welding direction 22. At the focus 18 of the laser, the component 2 is melted and thermal conduction creates a molten pool 24 about this point. As the laser beam 14 moves in the welding direction 22, the molten material cools and solidifies, creating a weld 26, which trails the laser beam 14. During trials, the laser head 8 was kept a vertical distance of two hundred millimeters from the component 2, however this is not intended to be a limiting feature.

Plasma is generated as the laser beam 14 melts the component 2 and is ejected from the surface 28 of the component to form a cloud between the laser head and the component 2. In addition, particles are ejected from the molten pool 24. The plasma and particles both absorb energy from the laser beam 14, reducing the amount of energy reaching the component 2 and so reducing the depth of weld 26 that can be achieved. To reduce this effect, plasma suppression means 30 is provided in close proximity to the intersection 22 between the laser beam axis 16 and the upper surface 24 of the component 2 to remove the plasma from the vicinity of the component surface 28. The plasma suppression means 30 comprises a copper pipe 32 of eight millimeters internal diameter. The pipe 32 is in flow communication at a first end 34 with an argon supply (not shown), and open at a second end 36 to form a nozzle 36. The suppression means 30 is oriented at forty-five degrees to the surface 28 of the component 2. The nozzle 36 of the suppression means 30 points at the component 2 so that the centreline 38 of the pipe 32 intersects the surface 28 at a point behind the laser beam in the welding direction 22, four millimeters from the beam axis 16 in the horizontal plane. The exit of the nozzle 36 is raised from the surface 28 of the component 2 by a vertical distance of two millimeters.

During welding, argon gas is supplied to the plasma suppression means 30 at a flow rate of 14 liters per minute. The gas impinges the component surface 28 adjacent the weld pool and is deflected across the laser beam 14. The arrangement ensures that the gas does not significantly effect the molten pool 24, as this would reduce the quality of the weld. As the gas flow traverses the laser beam 14, it removes the plasma from the laser beam 14 path in the vicinity of the component 2.

Trials have shown that the plasma suppression means 30 works well over a range of parameters, although those described above are preferred. The copper pipe 32 may have an internal diameter of between about six millimeters and about ten millimeters and may be oriented to the component 2 at an angle of between about thirty-eight and about fifty-two degrees. The suppression means works well when the centreline of the pipe 32 intersects the component 2 at a point horizontally offset from the axis of the laser beam pipe between about one millimeter and about five millimeters, and with the nozzle vertically offset between about two millimeters and about five millimeters. Argon may be supplied at a rate of between about ten liters per minute and about eighteen liters per minute, or a different gas may be used such as carbon dioxide or another inert gas such as helium.

Gas extraction means 40 is located adjacent the laser beam 14 opposite the plasma suppression means 30. The extraction means 40 comprises a nozzle 42, adapted to suit the geometry of the component 2 being welded. For a flat component, the nozzle 42 comprises a rectangular opening ninety-five millimeters tall and seventy millimeters wide, scarfed at an angle of sixty degrees to the component surface 28. The nozzle is located fifty millimeters from the laser beam axis 16 in the horizontal plan, and two millimeters from the component surface 28 in the vertical plane at a point diametrically opposite the plasma suppression means 30. In operation, the nozzle extracts 80 cubic meters per hour of gas from the area surrounding laser beam 14, improving the velocity of argon gas across the laser beam 14.

A nozzle 44 with high width to depth ratio known as a 'spray head nozzle' is located adjacent the cover slide 20 in the horizontal plane, perpendicular to the laser axis 16. It comprises a horizontal row of sixteen, one millimeter internal diameter tubes 46. The tubes 46 are in flow communication at a first end 48 with a compressed air supply (not shown) and open at the opposite end 50 to form the nozzle 44. The exit of the nozzle 44 is offset five millimeters from the cover slide 20 in the vertical plane and offset ten millimeters horizontally. In operation, compressed air is supplied to the nozzle at sufficient rate to create a jet of compressed air travelling at thirty meters per second over the cover slide 20. The jet creates a traverse airflow beneath the laser lens to a depth of about one hundred millimeters, which protects the cover slide 20 from damage and which also removes any plasma not removed by the suppression means 30.

It is not intended that the invention should be limited to using a spray head nozzle 44 only as described above. The example given is a developmental model and it will be understood by the man skilled in the art that the salient features of the nozzle are that it has a flat aspect ratio, with a high gas flow velocity, causing a gas flow to some significant depth beneath the nozzle 44. This is quite unlike conventional 'air knives' used to protect the cover slide 18 of laser heads which are designed to minimised the disturbance to the atmosphere beneath them, between the laser head 8 and component 2. It will also be understood that compressed air is used as it is cheaper than using inert gasses, and contamination of the weld 26 is not likely given the distance therefrom. Nevertheless, it may be considered preferable to use an inert gas such as argon.

Together, the plasma suppression means 30 and spray head nozzle 44 work with the gas extraction means 40 to create a synergistic effect that removes plasma and other particles from the laser beam 14 path to improve the depth of weld that the laser 10 can achieve. Trials using the apparatus hereinbefore described have shown a twofold increase in weld depth over conventional plasma suppression means for a given laser 10 power output. Nevertheless, it is envisaged that the system might be, used without one of the features listed such as the gas extraction means 40.

To protect the weld from oxidation as it cools, oxidation suppression means 52 is located adjacent the plasma suppression means 30. The oxidation suppression means comprises a copper pipe 54 of thirteen and a half millimeters internal diameter. The pipe 54 is in flow communication at a first end 56 with an argon supply and open at a second end to form a nozzle 58 which is filled with Retemet 60, a porous metal compound. The oxidation suppression means 52 is oriented at forty-five degrees to the surface 28 of the component 2, with the nozzle 58 scarfed at a forty-five degree angle to the pipe axis so that the face lies parallel to the surface 28.

During welding argon is supplied, via the oxidation suppression means 54, to cover the weld 28 as it cools. The Retemet 58 ensures that the gas flow out of the nozzle 58 diffuses to cover the weld 28 evenly. At the same time, argon is supplied to the cavity 6 beneath the component to protect the underneath of the weld from oxidation.

For clarity, the invention is described in the following numbered paragraphs;

1. Laser welding apparatus, in which a laser beam is impinged upon a component to be welded at a laser beam impingement point, wherein plasma suppression means is arranged to impinge a jet of gas on the component at an angle between about 38° and about 52° to its surface, flowing towards the laser beam impingement point, at a distance of at least 1 mm from the laser beam axis, such that the gas is deflected across the laser beam.

2. Laser welding apparatus as described in paragraph 1 wherein the laser welding apparatus comprises a laser head to focus the laser beam on the laser beam impingement point, and there is provided a nozzle adjacent the laser head that, in use, provides a jet of high velocity gas over the laser head.

3. Laser welding apparatus as described in paragraph 1 or 2 wherein the apparatus further comprises a gas extraction means located adjacent the laser beam, diametrically opposite the plasma suppression means.

4. Laser welding apparatus as described in paragraph 1 wherein the plasma suppression means is adapted to supply gas to impinge the, component at an angle of between about 38° and 52°.

5. Laser welding apparatus as described in paragraph 4 wherein the plasma suppression means is adapted to supply gas to impinge the component at an angle of about 45°.

6. Laser welding apparatus as described in paragraph 1 wherein the plasma suppression means is adapted to supply gas at a rate of between about 10 and 18 liters per minute.

7. Laser welding apparatus as described in paragraph 6 wherein the plasma suppression means is adapted to supply gas at a rate of about 14 liters per minute.

8. Laser welding apparatus as described in paragraph 1 wherein the plasma suppression means comprises tubular supply means.

9. Laser welding apparatus as described in paragraph 8 wherein the inner diameter of the tubular supply means is between about 6 mm and about 10 mm.

10. Laser welding apparatus as described in paragraph 9 wherein the inner diameter of the tubular supply means is about 8 mm.

11. Laser welding apparatus as described in paragraph 1 wherein the gas supplied by the plasma suppression means is an inert gas.

12 Laser welding apparatus as described in paragraph 11 wherein the gas supplied by the plasma suppression means is argon.

13 Laser welding apparatus as described in paragraph 1 wherein the plasma suppression means is adapted to supply gas to impinge the component at a distance of between about 1 mm and about 5 mm from the laser beam.

14 Laser welding apparatus as described in paragraph 13 wherein the plasma suppression means is adapted to supply gas to impinge the component at a distance of about 4 mm from the laser beam.

15 Laser welding apparatus as described in paragraph 1 wherein the plasma suppression means is arranged such that the gas exits the suppression means at a distance from the component surface of between about 2 mm and about 5 mm.

16 Laser welding apparatus as described in paragraph 15 wherein the plasma suppression means is arranged such that the gas exits the suppression means at a distance from the component surface of about 2 mm.

17 Laser welding apparatus as described in paragraph 2 wherein the nozzle is a spray head nozzle.

18 Laser welding apparatus as described in paragraph 2 wherein the high velocity gas exits the secondary supply means at, at least, 30 m/s.

19 Laser welding apparatus as described in paragraph 2 wherein the exit nozzle of the secondary gas supply means is approximately 5 mm from the laser head.

20 Laser welding apparatus as described in paragraph 2 wherein the exit nozzle comprises a row of small tubular outlets.

21 Laser welding apparatus as described in paragraph 20 wherein the small tubular outlets all have an internal diameter of approximately 1 mm.

22 Laser welding apparatus as described in paragraph 2 wherein the gas supplied via the secondary gas supply means is air.

23 A laser welding apparatus as described in paragraph 3 wherein the gas extraction means lies between about 2 mm and about 5 mm form the surface of the component.

24 A laser welding apparatus as described in paragraph 3 wherein the opening of the gas extraction means lies about 50 mm away from the axis of the laser beam.

25 A laser welding apparatus as described in paragraph 3 wherein the gas extraction means is capable of extracting gas at a rate of about 80 m³/hour.

26 A method of laser welding a component the steps of, focusing a laser beam on substrate component, moving the component relative to the laser beam such that the laser beam impingement point moves in a welding direction, and supplying a plasma suppression gas to impinge the component adjacent the laser beam impingement point, wherein the gas flow is arranged to impinge the component at an angle of between 30° and about 60° to the component surface, and at a distance from the laser beam of at least 1 mm.

27 A method of laser welding a component as described in paragraph 26 wherein plasma suppression gas is supplied to impinge at a point that lies behind the laser impingement point in the welding direction.

The invention claimed is:

1. A laser welding apparatus comprising a laser head, plasma suppression means, and gas extraction means in which:

the laser head focuses a laser beam upon a component to be welded, at a laser beam impingement point, the laser welding apparatus is adapted to move the laser beam relative to the workpiece in a welding direction, the plasma suppression means is positioned behind the laser head, relative to the welding direction, and is arranged to impinge a jet of gas on the component in the welding direction, at an angle between about 38° and about 52° to the component surface, flowing towards the laser beam impingement point, at a distance of at least 1 mm from the laser beam axis, such that the gas is deflected across the laser beam, and the gas is extracted by the extraction means located in front of the laser head, relative to the welding direction, and adjacent the laser beam, diametrically opposite the plasma suppression means.

2. A laser welding apparatus as claimed in claim 1 wherein the laser welding apparatus comprises a laser head to focus the laser beam on the laser beam impingement point, and there is provided a nozzle adjacent the laser head that, in use, provides a jet of high velocity gas over the laser head.

3. A laser welding apparatus as claimed in claim 2 wherein the nozzle is a spray head nozzle.

4. A laser welding apparatus as claimed in claim 2 wherein the high velocity gas exits the nozzle at, at least, 30 m/s.

5. A laser welding apparatus as claimed in claim 2 wherein the exit nozzle comprises a row of small tubular outlets.

6. A laser welding apparatus as claimed in claim 1 wherein the plasma suppression means is adapted to supply gas to impinge the component at an angle of about 45°.

7. A laser welding apparatus as claimed in claim 1 wherein the plasma suppression means is adapted to supply gas at a rate of between about 10 and 18 liters per minute.

8. A laser welding apparatus as claimed in claim 7 wherein the plasma suppression means is adapted to supply gas at a rate of about 14 liters per minute.

9. A laser welding apparatus as claimed in claim 1 wherein the plasma suppression means comprises tubular supply means.

10. A laser welding apparatus as claimed in claim 9 wherein the inner diameter of the tubular supply means is between about 6 mm and about 10 mm.

11. A laser welding apparatus as claimed in claim 1 wherein the gas supplied by the plasma suppression means is an inert gas.

12. A laser welding apparatus as claimed in claim 1 wherein the plasma suppression means is adapted to supply gas to impinge the component at a distance of between about 1 mm and about 5 mm from the laser beam.

13. A laser welding apparatus as claimed in claim 12 wherein the plasma suppression means is adapted to supply gas to impinge the component at a distance of about 4 mm from the laser beam.

14. A laser welding apparatus as claimed in claim 1 wherein the plasma suppression means is arranged such that the gas exits the suppression means at a distance from the component surface of between about 2 mm and about 5 mm.

15. A laser welding apparatus as claimed in claim 14 wherein the plasma suppression means is arranged such that the gas exits the suppression means at a distance from the component surface of about 2 mm.

16. A laser welding apparatus as claimed in claim 1 wherein the gas extraction means lies between about 2 mm and about 5 mm from the surface of the component.

17. A method of laser welding a component comprising the steps of:

focusing a laser beam via a cover slide onto the component to generate a weld pool;

moving the component relative to the laser beam such that the laser beam impingement point moves in a welding direction;

using plasma suppression means to direct plasma suppression gas from behind the laser beam, relative to the welding direction, to impinge the component adjacent the laser beam impingement point at an angle of between 30° and 60° to the component surface, at a distance from the laser beam of at least 1 mm, wherein the plasma suppression gas impinges the component surface adjacent the weld pool at a point that lies behind the laser impingement point in the welding direction such that the plasma suppression gas is deflected across the laser beam; and extracting the plasma suppression gas via gas extraction means provided in front of the laser beam, relative to the welding direction, and adjacent the laser beam, diametrically opposite the plasma suppression means.

* * * * *